United States Patent [19]

Sacripante et al.

[11] Patent Number: 5,449,719
[45] Date of Patent: Sep. 12, 1995

[54] TWO-STEP PROCESSES FOR THE PREPARATION OF UNSATURATED POLYESTERS

[75] Inventors: Guerino G. Sacripante, Oakville; Enno E. Agur, Toronto; Michael S. Hawkins, Cambridge, all of Canada

[73] Assignee: Xerox Corporation, Stamford, Conn.

[21] Appl. No.: 270,610

[22] Filed: Jul. 5, 1994

[51] Int. Cl.6 .............................................. C08F 20/00
[52] U.S. Cl. ..................... 525/445; 430/109; 430/904; 528/196
[58] Field of Search ................ 525/10, 41, 445; 430/109, 904; 528/196

[56] References Cited

U.S. PATENT DOCUMENTS

| | | | |
|---|---|---|---|
| 3,590,000 | 6/1991 | Palermiti et al. | 252/62.1 |
| 3,681,106 | 8/1972 | Burns et al. | 117/17.5 |
| 4,533,614 | 8/1985 | Fukumoto et al. | 430/99 |
| 4,788,122 | 11/1988 | Kawabe et al. | 430/109 |
| 4,804,622 | 2/1989 | Tanaka et al. | 430/109 |
| 5,227,460 | 7/1993 | Mahabadi et al. | 528/272 |

*Primary Examiner*—James J. Seidleck
*Assistant Examiner*—Terressa Mosley
*Attorney, Agent, or Firm*—E. O. Palazzo

[57] ABSTRACT

A process for the preparation of an unsaturated polyester which comprises the first reaction of a phthalate and a glycol to provide a transesterified product, and subsequently a second reaction comprising reacting said product with an unsaturated dicarboxylate monomer.

13 Claims, No Drawings

TWO-STEP PROCESSES FOR THE PREPARATION OF UNSATURATED POLYESTERS

BACKGROUND OF THE INVENTION

The present invention is generally directed to a process for the preparation of unsaturated polyester polymers, particularly useful for preparing low-fix temperature, crosslinked toner resins and processes thereof. In embodiments, the process comprises a two step monomer addition procedure of first transesterifying a diester, such as dimethyl terephthalate, and a glycol, such as 1,2-propanediol, followed by the subsequent addition of the unsaturated diacid, such as fumaric acid, to enable an unsaturated polyester with uniform distribution of unsaturated moiety on the polymeric chain useful for crosslinking to a higher gel, such as from about 0.1 percent to about 60 percent, with less initiator concentration, such as from about 0.05 to about 2 percent, and preferably from about 0.05 to about 1 percent by weight of resin. Toners containing the crosslinked polyesters obtained with the process of the present invention exhibit desirable low temperature fixing characteristics and excellent offset properties.

Conventional electrophotographic processes usually require temperatures of 160°0 to 200° C. to fix the dry toner, or toner particles on a support medium, such as a sheet of paper or transparency, creating a developed image. These high temperatures may reduce or minimize fuser roll life, such as fuser rolls of silicone rubbers or fluoroelastomers like VITON ®, may limit fixing speeds and may necessitate higher power usage during operation, such as in a xerographic copier employing a hot roll fixing mechanism.

Electrophotographic toners are generally prepared by mixing or dispersing a colorant and an optional charge enhancing additive into a thermoplastic binder resin, followed by micropulverization. Known conventional thermoplastic binder resins include polystyrenes, styrene acrylic resins, styrene methacrylic resins, polyesters, epoxy resins, acrylics, urethanes and copotymers thereof. Carbon black is often used as a colorant and alkyl pyridinium halides, distearyl dimethyl ammonium methyl sulfate, and the like can be employed as charge enhancing additives.

Although many processes exist for fixing toner to a support medium, hot roll fixing transfers heat very efficiently and is especially suited for high speed electrophotographic processes. In this method, a support medium carrying a toner image is transported between a heated fuser roll and a pressure roll with the image face contacting the fuser roll. Upon contact with the heated fuser roll, the toner melts and adheres to the support medium to fix an image.

Toner fixing performance may be characterized as a function of temperature. The lowest temperature at which the toner adheres to the support medium is referred to as the cold offset temperature. The maximum temperature at which the toner adheres to the fuser roll is referred to as the hot offset temperature. When the fuser temperature exceeds the hot offset temperature, some of the molten toner adheres to the fuser roll during fixing, is subsequently transferred to a substrate, a phenomenon known as offsetting, and results, for example, in blurred images. Between the cold offset temperature and hot offset temperature of the toner is the minimum fix temperature which is the minimum temperature at which acceptable adhesion of the toner to the support medium occurs. The difference between minimum fix temperature and hot offset temperature is referred to as the fusing latitude.

Several problems exist with the hot roll fixing system described above and with toners presently used with this system. For example, binder resins in the toners can require a relatively high temperature in order to be affixed to the support medium. A high temperature may result in high power consumption, low fixing speeds, reduced fuser roll, reduced roll bearing life, and offsetting.

Toner resins that have a low fix temperature below 200° C. ("low melt toner resin"), preferably below 160° C., and exhibit good offset temperature performance are desired. Processes for preparing such toner resins are, therefore, desirable. Toners operating at lower temperatures reduce power needs and increase component life. Low melt toners reduce volatilization of release oil such as silicone oil. Volatilization, which may occur during high temperature operation, causes problems when the volatilized oil condenses on other areas of the machine. Toners with wide fusing latitude permit liberal requirements for oil used as a release agent. The toners may provide improved particle elasticity and may minimize copy quality deterioration related to toner offset. Hence, the desirability of lowmelt temperature toner resins, particularly for use in hot-roll fixing xerographic processes, is apparent.

Resins with a lower minimum fix temperature usually possess a lower molecular weight than resins with higher minimum fix temperatures. U.S. Pat. No. 3,590,000 and U.S. Pat. No. 3,681,106 disclose the use of polyester resins as a toner binder. Although a minimum fix temperature of polyester binder resin can be lower than resins generated from other materials, such as styrene-acrylic and styrene-methacrylic resins, the use of polyester resin as toner binder can lead to undesirable lower hot offset temperature. This results in a decreased offset resistance, and a decreased glass transition temperature, possibly negatively impacting toner blocking, which occurs during storage.

Resin structure modification by branching, crosslinking, grafting, and the like using conventional polymerization and condensation reactions may also improve offset resistance. It is known that trivalent or more polyol or polyacid can be mixed with monomer to provide nonlinear polymer modification. Branching during polycondensation results in improved offset resistance. However, too much branching can result in an increased minimum fix temperature, diminishing any advantage of the modified polymer.

U.S. Pat. No. 4,533,614 discloses a nonlinearly modified lowmelting polyester containing: 1) an alkyl-substituted dicarboxylic acid and/or an alkyl-substituted diol; 2) a trivalent or more polycarboxylic acid and/or a trivalent or more polyol; 3) a dicarboxylic acid; and 4) an etherated diphenol. The main acid component of the polyester requires 50 mole percent, preferably 60 mole percent or more, of an aromatic dicarboxylic acid, its analogous anhydride, or other dicarboxylic acids to impart sufficient electrophotographic charge characteristics to a toner made from the resin. Modified polyesters having less than this amount of aromatic acid do not impart sufficient charge characteristics.

In U.S. Pat. No. 5,227,460, there is disclosed a commercially available poly(propoxylated bisphenol A cofumarate) having a corresponding bisphenol residue in the polyester backbone. The linear resins disclosed in these references exhibit desirable rheological properties when crosslinked with, for example, benzoyl peroxide at a concentration of from about 0.01 to about 0.2 percent by weight, and enable a crosslinked polyester with from about 7 to about 40 percent gel content determined utilizing tetrahydrofuran as the solvent. The aforementioned linear unsaturated polyester resin can be prepared, for example, by condensing in a reactor a first monomer comprised of an organic diol with a second monomer comprised of an organic diacid such as fumaric acid with a catalyst. The corresponding product has an alternating structure of unsaturated maleate moiety with a saturated bisphenol A organic moiety.

In U.S. Pat. No. 5,348,830, the disclosure of which is totally incorporated herein by reference, there is illustrated a lower cost crosslinked polyester resin derived from the reaction of benzoyl peroxide with a lower cost unsaturated linear polyester, wherein the linear unsaturated polyester resin can be selected from about 50 mole percent of lower cost glycols, such as 1,2-propanediol and 1,2-ethanediol, and from about 30 to 45 mole percent of a low cost diester, such as dimethylterephthalate, and about 5 to about 20 mole percent of unsaturated diester or acid, such as fumarates. The process for the preparation of the aforementioned unsatured polyester is performed by condensing in a reactor a monomer comprised of an organic diol or mixture of diols with a monomer mixture comprised of an organic diester, such as dimethyl terephthalate and dimethylfumarate, with a catalyst. The monomers are thoroughly mixed to form a homogeneous solution. The solution is heated to a temperature at which a clear melt of the starting monomers is obtained, at which time a catalyst may be added to promote transesterification. Volatile alcohol byproducts from the transesterification, such as methanol or ethanol, is removed from the reaction system until more than 90 percent of the theoretical volatile alcohol has been removed. Transesterification catalysts may include tetraisopropyl orthotitanate transesterification catalyst, tetrabutyl orthotitanate monobutyl tin oxide, for example FASCAT® 4100, a registered trademark of M&T Chemicals Inc., and dibutyl tin oxide. This is then followed by further heating the transesterification product at a temperature ranging from about 150° to about 250° C., preferably from about 185° C. to about 215° C., and wherein the polycondensation reaction liberates the excess diol monomer which is removed under a generated vacuum, such as from about 760 millimeters-Hg to about 0.1 millimeter-Hg. Total reaction times may range from about 5 to about 16 hours. The resulting unsaturated polyester is then crosslinked in a melt mixer or alternatively by the reactive extrusion process as disclosed in U.S. Pat. No. 5,227,460, with the utility of benzoyl peroxide as the crosslinking initiator at a concentration of from about 0.25 to about 3.0 percent by weight. In Example X and Example XI of the '460 patent, about 1.7 percent by weight of benzoyl peroxide was utilized as the initiator for obtaining a crosslinked polyester based toner derived from low cost monomers such as 1,2-propanediol, 1,2-ethanediol, dimethylterephthalate and dimethylfumarate.

The use of excessive amounts of crosslinking initiator, such as benzoyl peroxide, is found to be undesirable because it tends to generate benzoic acid after it is consumed, thereby imparting high acid numbers in the toner composite. Toners with high acid numbers, such as from about 300 milliequivalents of potassium hydroxide or higher, are known to be undesirable for stable developments wherein the triboelectric charge of the toner developer is affected by environmental humidity conditions. Furthermore, the use of excessive amounts of crosslinking initiator, such as benzoyl peroxide, is undesirable during the manufacturing of the toner composites, especially during micronization or pulverization wherein benzoic acid particles as well as benzoyl peroxide particles are generated and cause contamination. Furthermore, the use of excessive peroxide initiator poses health risks to the workers. Additionally, lowering the amount or concentration of initiator, such as benzoyl peroxide, is of importance in obtaining a polyester with less impurities.

In the present invention, the use of the crosslinking initiator is minimized, such as from about 0.05 to about 1 percent by weight of unsaturated polyester, in yielding the lower cost crosslinked polyester based toner with low fixing and broad fusing latitude characteristics. The process of the present invention differs from the copending application U.S. Pat. No. 5,348,830 in that, for example, a two step addition, one pot procedure is utilized to assure that with the invention the unsaturated moiety is uniformly distributed throughout the polyester resin, hence permitting the use of lower amounts of crosslinking initiator, such as from about 0.05 to about 0.3 percent by weight to yield a crosslinked polyester based toner with low fixing and broad fusing latitude characteristics. More specifically, the process of this invention involves adding to a reactor with about 50 mole percent of diol or mixture of diols, such as 1,2-propanediol and 1,2-ethanediol, about 30 to 45 mole percent of low cost diester such as dimethylterephthalate and a transesterification catalyst, and by heating from about 160° C. to about 185° C. thereby generating and removing the transesterified product, such as methanol, in the distillation receiver until more than about 90 percent of the theoretical methanol is removed, followed by a second step wherein the unsaturated monomer, such as maleic anhydride, fumaric acid or dimethyl fumarate, is added to the reaction mixture, and further heating the transesterification product at a temperature ranging from about 150° to 250° C., and preferably from about 185° C. to about 215° C., and wherein the polycondensation reaction liberates the excess diol monomer, which can be removed under a vacuum, such as from about 760 millimeters-Hg to about 0.1 millimeter-Hg. Total reaction times may range from about 5 to about 12 hours. The unsaturated polyester derived from this two step addition process is found to crosslink with less initiator than a similar formulated polyester derived from the process of the prior art involving a one step addition as illustrated herein. It is believed that the present two step addition process, uniformly distributes the unsaturated moiety through the polyester chain, hence requiring less initiator concentration to generate similar gel contents.

In U.S. Pat. No. 5,391,452, the disclosure of which is totally incorporated herein by reference, there is illustrated a toner composition comprised of pigment, an optional charge enhancing additive and a side chain polymer comprised of a polyester present as a side chain on a polyalkylene of the following formula

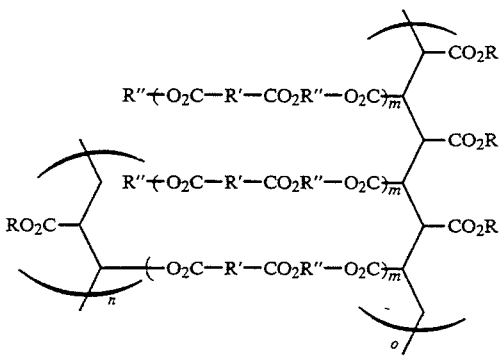

wherein m, n, and o represent the number of monomer segments present; R is independently selected from the group consisting of hydrogen and alkyl; R' is independently selected from the group consisting of aryl and alkyl; R" is independently selected from the group consisting of alkylene and oxyalkylene; and wherein m is from about 10 to about 1,000, n is from about 1 to about 1,000 and o is from about 10 to about 1,000. Also, in U.S. Pat. No. 5,376,494, the disclosure of which is totally incorporated herein by reference, there is illustrated a reactive melt mixing process of preparing low fix temperature toner resin, comprising the steps of (a) melting a reactive base resin, thereby forming a polymer melt; and (b) crosslinking said polymer melt under high shear to form a crosslinked toner resin.

There is a need for a crosslinked polyester derived from the crosslinking of an unsaturated polyester of low cost with minimal amount of crosslinking initiator. There is also a need for a crosslinked polyester based toner with low minimum fixing temperature, such as from about 120° C. to about 145° C., with broad fusing latitude of from about 30° C. to about 60° C., with low relative humidity sensitivity, such as from about 1 to about 2.3, as illustrated in copending application U.S. Ser. No. 251,430 (D/93410), the disclosure of which is totally incorporated herein by reference. These needs are achieved by the process of this invention wherein a two step addition method for the fabrication of the unsaturated polyester resin enables excellent uniformly distributed unsaturated moieties in the polyester chain, hence resulting in a higher degree of crosslinking with the utility of less crosslinking initiator.

SUMMARY OF THE INVENTION

It is an object of the present invention to provide an economical process for the preparation of unsaturated polyesters by a two step method to enable a superior distribution of the unsaturated moiety, thus less initiator is needed for crosslinking.

It is another object of the present invention to provide a crosslinked polyester derived from the reaction of a crosslinking initiator and unsaturated polyester prepared by a two step process with uniform distribution of the unsaturated moiety.

Moreover, in another object of this invention there is provided a crosslinked polyester derived from the reaction of an unsaturated polyester by a two step process and with low concentrations of initiator, such as benzoyl peroxide, from about 0.05 to about 1 percent by weight of polymer.

In yet another object of this invention there is provided a crosslinked polyester based toner with low humidity sensitive such as from about 1.0 to about 2.5.

Also, in yet another object of the present invention there are provided low humidity sensitive toners with broad fusing latitude, such as from about 30° C. to about 45° C.

In yet another object of this invention there is provided a crosslinked polyester based toner with low humidity sensitive, such as from about 1.0 to about 2.5, toners with low minimum fixing temperatures, such as from about 125° C. to about 145° C., and broad fusing latitude, such as from about 30° C. to about 45° C.

Furthermore, in yet another object of the present invention there are provided toner and developer compositions that are useful in a variety of electrostatic imaging and printing processes, including color xerography, and wherein the admix charging times are less than or equal to about 60 seconds.

Moreover, in another object of the present invention there are provided processes for the preparation of unsaturated polyesters wherein the concentration of initiator is less than about 1 weight percent, and wherein a two step addition of monomers is selected rather than the prior art one step process.

Another object of the present invention resides in the provision of toners containing a low cost unsaturated polyester obtained with the two step processes illustrated utilizing low cost monomers such as aliphatic glycols and terephthalic acid dialkyl esters as illustrated herein.

Additionally, another object of the present invention is to provide processes for the preparation of unsaturated polyesters with at least one or more diols, and at least two or more diacid components, one of which is a diacid component of the unsaturated polyester, which component is present in an amount of from about 1 to 30, and preferably 5 to 30 mole percent. The resin obtained can subsequently be crosslinked in a reactive extruder, reference U.S. Pat. No. 5,227,460, the disclosure of which is totally incorporated herein by reference. Thus, the resins obtained with the processes of the present invention can be selected as the base resin in reactive extrusion processes.

These and other objects of the present invention are accomplished by the provision of improved processes for the preparation of unsaturated polyesters. In embodiments, the process of the present invention comprises the reaction of phthalate, such as dimethyl terephthalate, with a glycol or mixture of glycols to provide a transesterified product of, for example, a bis-(glycol)-terephthalate. Subsequently, there is added to the reaction product an acid like fumaric acid to provide unsaturation and enable the desired unsaturated polyester product.

In an embodiment of the present invention, there is provided a two step monomer addition process for the fabrication of a low cost, economical unsaturated polyester resin by a first step comprised of (a) charging a reactor equipped with a double turbine agitator and distillation receiver with about 30 to about 45 mole percent of a diester, such as dimethylterephthalate, from about 95 to about 100 mole percent of diol or mixture of diols, such as 1,2-propanediol and 1,2-ethanediol, and a transesterification catalyst, such as butyltin oxide hydroxide or dibutyltin oxide, of from about 0.02 to about 1 mole percent of total monomer content; (b) heating the aforementioned mixture to a temperature of from about 160° C. to about 190° C. for a duration of from about 3 hours to about 6 hours, and wherein the transesterification product comprised of the bis(glycol)terephthalate is formed with elimination of methanol as the byproduct and is collected in a distillation receiver of from about 80 to about 95 percent of the theoretical amount total methanol to be collected; followed by a second step comprised of (c) adding to the reactor mixture, preferably via the condenser port, from about 5 to about 20 mole percent of unsaturated moiety, such as fumaric acid or dimethylterephthalate; and (d) continue heating at from about 175° C. to about 190° C. for a duration of about 1 hour, followed by heating the mixture from about 190° C. to about 220° C. and reducing the pressure to from about 760 millimeters-Hg to about 0.1 millimeter-Hg during a period of from about 3 hours to about 6 hours, and wherein about 40 to about 50 mole percent of the excess glycol is collected in the distillation receiver. The polyester base resin product is then discharged through the bottom drain valve and cooled to ambient temperature.

The invention process thus provides unsaturated linear polyester polymers with uniform distribution of unsaturated moieties, especially with polyester compositions derived from low cost aliphatic glycol monomers, which polyesters are capable of undergoing subsequent crosslinking with free radical initiator present in low concentration, such as from about 0.05 to about 1 percent by weight, to obtain high-density crosslinked toner resins for use in toners having desirable rheological properties. The crosslinked product of the inventive polymers can be sufficiently fixed at low temperatures, for example below 160° C., and preferably below 145° C., for example 125° C. to 140° C., by hot roll fixing. In addition, crosslinked resins prepared from polymers of the present invention exhibit desirable hot offset and glass transition temperatures. The inventive polymers are particularly useful as crosslinked toner resins and exhibit excellent characteristics comparable to more costly commercially available crosslinked resins.

Examples of aliphatic glycols that can be selected for the processes of the present invention in amounts of, for example, from about 49 to about 51 mole percent of polymer, include 1,2-ethanediol, 1,2-propanediol, 1,3-propanediol, 1,2-butanediol, 1,3-butanediol, 1,4-butanediol, 1,2-pentanediol, 1,3-pentanediol, 1,4-pentanediol, 1,5-pentanediol, 1,6-hexanediol, diethylene glycol, neopentyl glycol, dipropylene glycol, dibromoneopentyl glycol, 2,2,4-trimethylpentane, 1,4-cyclohexanediol, 1,3-cyclohexanediol, 1,4-cyclohexanedimethanol, 1,3-cyclohexanedimethanol, and the like, and mixtures thereof.

Examples of unsaturated acid reactants that can be selected for the processes of the present invention in amounts of, for example, from about 5 to about 20 mole percent of polymer, include maleic acid, maleic anhydride, fumaric acid, chloromaleic acid, itaconic acid, citraconic acid, mesaconic acid, esters thereof and the like, and preferably fumaric acid.

Examples of aromatic dicarboxylic acids and esters of acids that can be selected for the processes of the present invention in amounts, for example, of from about 5 to about 20 mole, include terephthalic acid, isophthalic acid, phthalic acid, benzophenone-4,4'-dicarboxylic acid, 1,2-diphenoxyethane-p,p'-dicarboxylic acid, tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, dimethyl terephthalate, their esters, and the like. A preferred ester of terephthalic acid is dimethyl terephthalate.

Transesterification catalysts that can be selected for the processes of the present invention in amounts, for example, of from about 0.01 to about 2 percent by weight of polymer, include tetraisopropyl orthotitanate transesterification catalyst, tetrabutyl orthotitanate monobutyl tin oxide (FASCAT 4100 ®, a registered trademark of M&T Chemicals Inc.), dibutyltin oxide, and other transesterification catalysts selected for polyester synthesis.

The weight average molecular weight, $M_w$, of the inventive polymer may be in the range of about 5,000 to 20,000, and the number average molecular weight, $M_n$, of the inventive polymer may be in the range of about 2,000 to about 6,000.

The linear unsaturated inventive polymer may be crosslinked using known crosslinking initiators in amounts of from about 0.05 to about 2 percent and preferably from about 0.05 to about 1 percent by weight of polymer, which initiators can be selected from the group including peroxides or azo compounds such as decanoyl peroxide, lauryl peroxide, benzoyl peroxide, cyclohexanone peroxide, tobutyl peroxy neodecanoate, t-amyl peroxide, t-butylcumyl peroxide, azo-bis-isobutyronitrile, 2,2'-azobis (isobutyronitrile), mixtures and the like.

Densely crosslinked toner resins may be crosslinked by a reactive extrusion process, reference U.S. Pat. No. 5,227,460, the disclosure of which is totally incorporated herein by reference. Reactively extruded polymer resins comprise very high molecular weight, densely crosslinked microgel particles, insoluble in substantially any solvent, including tetrahydrofuran, toluene, and the like. The linear portion comprises low molecular weight resin soluble in various solvents, such as for example tetrahydrofuran, toluene, and the like. High molecular weight, highly crosslinked gel particles are substantially uniformly distributed in the linear portions. Substantially no portion of the resin, crosslinked by reactive extrusion, comprises sol (low density crosslinked polymer), such as that which would be obtained in crosslinking processes, such as polycondensation, bulk, solution, suspension, emulsion and dispersion polymerization processes.

Resins prepared from the inventive polymers are generally present in a toner in an amount of from about 40 to about 98 percent by weight, and more preferably from about 70 to about 98 percent by weight. Toner resins prepared from invention process polymers may be subsequently melt blended or otherwise mixed with a colorant, charge carrier additives, surfactants, emulsifiers, pigment dispersants, flow additives, and the like. The toner product can then be pulverized by known methods, such as milling, to form toner particles. The toner particles preferably have an average volume particle diameter of about 5 to about 25, more preferably about 5 to about 15 microns.

Various suitable colorants can be employed in the toners, including suitable colored pigments, dyes, and mixtures thereof, including carbon black, such as REGAL 330 ® carbon black (Cabot), Acetylene Black, Lamp Black, Aniline Black, Chrome Yellow, Zinc Yellow, Sicofast Yellow, Luna Yellow, NOVAPERM YELLOW TM, Chrome Orange, Bayplast Orange, Cadmium Red, LITHOL SCARLET TM, HOS- TAPERM RED ™, FANAL PINK ™, Hostaperm Pink ™, Lithol Red ™, Rhodamine Lake B, Brilliant Carmine, HELIOGEN BLUE ™, HOSTAPERM BLUE ™, NEOPAN BLUE ™, PV FAST BLUE ™, CINQUASSI GREEN ™, HOSTAPERM GREEN ™, titanium dioxide, cobalt, nickel, iron powder, SICOPUR 4068 FF ™, and iron oxides, such as MAPICO BLACK ™ (Columbia), NP608 ™ and NP604 ™ (Northern Pigment), BAYFERROX 8610 ™ (Bayer), MO8699 ™ (Mobay), TMB-100 ™ (Magnox), mixtures thereof, and the like.

The colorant, preferably carbon black, cyan, magenta and/or yellow colorant, is incorporated in an amount sufficient to impart the desired color to the toner. In general, pigment or dye is employed in an amount ranging from about 2 to about 60 percent by weight, and preferably from about 2 to about 7 percent by weight for color toner and about 5 to about 60 percent by weight for black toner.

Various known suitable effective positive or negative charge enhancing additives can be selected for incorporation into the toner compositions prepared with the inventive process polymers, preferably in an amount of about 0.1 to about 10, more preferably about 1 to about 3 percent by weight. Examples of charge additives include quaternary ammonium compounds inclusive of alkyl pyridinium halides; alkyl pyridinium compounds; organic sulfate and sulfonate compositions; cetyl pyridinium tetrafluoroborates; distearyl dimethyl ammonium methyl sulfate; aluminum salts such as BONTRON E84 ™ or E88 ™ (Hodogaya Chemical); and the like.

Additionally, other internal and/or external additives may be added in known amounts to impart known functions to the resulting toners. The selected carrier particles for forming developers can be used with or without a coating, the coating generally being comprised of fluoropolymers, such as polyvinylidene fluoride resins, terpolymers of styrene, methyl methacrylate, and a silane, such as triethoxy silane, tetrafluoroethylenes, other known coatings, and the like.

The toners or developers generated from the polymers obtained with the processes of the present invention can be charged triboelectrically, and applied to an oppositely charged latent image on an imaging member such as a photoreceptor or ionographic receiver. The resultant toner image can then be transferred, either directly or via an intermediate transport member, to a support such as paper or a transparency sheet. The toner image can be fused to the support by application of heat and/or pressure, for example with a heated fuser roll at a temperature lower than 200° C., preferably lower than 160° C., more preferably lower than 140° C., and more preferably about 110° C.

While the invention has been described with reference to particular preferred embodiments, the invention is not limited to the specific examples given. Other embodiments and modifications can be made by those skilled in the art without departing from the spirit and scope of the invention. Parts and percentages are by weight unless otherwise indicated.

COMPARATIVE EXAMPLE I

A poly(1,2-propyleneterephthalate/1,2-propylenefumarate) copolymer was prepared by a one step process as illustrated in U.S. Pat. No. 5,348,830, the disclosure of which is totally incorporated herein by reference, by the following procedure.

A 3 liter glass reactor was assembled with a stainless steel helical anchor stirrer and high vacuum stirrer bearing adaptor, glass thermometer well and 250° C. thermometer, inert gas inlet adaptor, water-jacketed vigreux column fixed with a Dean Stark trap and condenser, and a full length heating mantle controlled with a 12R Thermowatch Regulator attached to the thermometer. To this were added 1,815.77 grams (9.35 moles) of dimethylterephthalate, 1673.98 grams (22.0 moles) of 1,2-propanediol, and 284.13 grams (1.65 moles) of dimethylfumarate, which components were added to the reactor. After the reactor and its contents reach 135° C. by heating with the mantle, a clear melt was obtained. The clear melt was argon sparged for approximately 20 minutes to remove dissolved oxygen. At this point, 5.34 grams (0.018 moles) of titanium (IV) isopropoxide transesterification catalyst were added to promote transesterification. Methanol was then removed by the Dean Stark trap/condenser system until 650 grams of the volatile alcohol (92 percent theoretical) were removed. At this time, the reactor was connected to a high vacuum trap system with two inline dry ice traps, and the reactor contents were raised to 200° C. Vacuum was slowly applied to remove excess 1,2-propanediol, after which full vacuum was obtained. After one hour and 20 minutes, a sample was analyzed and found to have a melt index of 78.0 (grams per ten minutes) at 105° C./2.160 kilograms and a Tg of 54° C., obtained using a Perkin Elmer DSC-4. Gel permeation chromatography of the polymer product confirmed a $M_w$ of 6,400, $M_n$ of 3,100 and a MWD of 2.3. The concentration of unsaturated units was approximately 6 weight percent of the resin or polymer product. The unsaturated, functional units were contributed by the fumarate. At this point the main batch of polymer was removed from the reactor.

The polymer was crosslinked using 0.5 percent and 1.0 percent benzoyl peroxide crosslinking initiator in a reactive extrusion process as disclosed in U.S. Pat. No. 5,227,460, the disclosure of which is totally incorporated herein by reference. Utilizing 0.5 percent of benzoyl peroxide, the crosslinked polyester was found to have a gel content of 18 percent using tetrahydrofuran as the solvent. Utilizing 1.0 percent of benzoyl peroxide, the crosslinked polyester was found to have a gel content of 42 percent with tetrahydrofuran as the solvent. The gel content was utilized as a measure to evaluate the amount of highly dense crosslinked portion of the resin.

EXAMPLE II

A Poly(1,2-propyleneterephthalate/1,2-propylenefumarate) copolymer of similar formulation of Comparative Example 1 was prepared by a the two step addition process of this invention as follows.

A 3 liter glass reactor was assembled with a stainless steel helical anchor stirrer and high vacuum stirrer bearing adaptor, glass thermometer well and 250° C. thermometer, inert gas inlet adaptor, water-jacketed vigreux column fixed with a Dean Stark trap and condenser, and a full length heating mantle controlled with a 12R Thermowatch Regulator attached to the thermometer. To this were added 1,815.77 grams (9.35 moles) of dimethylterephthalate, and 1,673.98 grams (22.0 moles) of 1,2-propanediol. After the reactor and its contents reach 135° C. by heating with the mantle, a clear melt was obtained. The clear melt was argon sparged for approximately 20 minutes to remove dissolved oxygen. At this point, 5.34 grams (0.018 mole) of titanium (IV) isopropoxide transesterification catalyst were added to promote transesterification. Methanol was then removed by the Dean Stark trap/condenser system until 595 grams of the volatile alcohol (92 percent theoretical) were removed and added to the reactor. At this time, the second step addition of the unsaturated monomer was accomplished by adding 284.13 grams (1.65 moles) of dimethylfumarate into reactor, and the reactor was connected to a high vacuum trap system with two inline dry ice traps, and the reactor contents were raised to 200° C. Vacuum was slowly applied to remove some methanol and excess 1,2-propanediol, after which full vacuum was obtained at 200 microns. After one hour and 20 minutes, a sample was analyzed and found to have a melt index of 76.0 (grams per ten minutes) at 105° C./2.160 kilograms and a Tg of 53.8° C., obtained using a Perkin Elmer DSC-4. Gel permeation chromatography of the copolymer product confirmed a $M_w$ of 6,300, $M_n$ of 3,070 and a MWD of 2.3. The concentration of unsaturated units was approximately 6 weight percent of the resin. The unsaturated, functional units were contributed by the fumarate. At this point the main batch of polymer was removed from the reactor.

The copolymer product was crosslinked using 0.25 percent and 0.5 percent benzoyl peroxide crosslinking initiator in a reactive extrusion process as in Comparative Example I, and as disclosed in U.S. Pat. No. 5,227,460. With 0.25 percent of benzoyl peroxide, the crosslinked polyester was found to have a gel content of 28 percent using tetrahydrofuran as the solvent. Utilizing 0.5 percent of benzoyl peroxide, the crosslinked polyester was found to have a gel content of 39 percent with tetrahydrofuran as the solvent. In comparison to the Comparative Example I crosslinked polyester, approximately 50 percent less benzoyl peroxide was necessary in the present Example, utilizing the unsaturated polyester prepared by a two step process to achieve similar gel content, hence similar crosslinking.

COMPARATIVE EXAMPLE III

An unsaturated polyester was prepared using 1,2-propanediol, ethanediol, terephthalic acid and fumaric acid as illustrated in Example X of U.S. Pat. No. 5,348,830, utilizing the one step process as follows.

Terephthalic acid (564 grams), fumaric acid (69.6 grams), 1,2-ethanediol (49.6 grams), 1,2-propanediol (547.2 grams) and FASCAT TM (3.2 grams) were charged into the Hoppes 2 liter pressure reactor equipped with a helical agitator and distillation apparatus. The mixture was heated to 240° C. under 420 killopascal pressure utilizing $CO_2$ gas. The mixture was stirred at 60 rpm for 4 hours, followed by decreasing the temperature to 220° C., and pressure to atmospheric pressure over a four hour period. The reactor pressure was then decreased to 0.5 millibar over a 3 hour period, during which time an additional 664 grams of byproduct was collected in the distillation receiver, followed by maintaining the pressure at 0.5 millibar for an additional hour. The reactor was then pressurized to atmospheric pressure with $CO_2$, and the product was discharged through the bottom drain valve into a metal dish. After the product was cooled to room temperature, the glass transition temperature of the unsaturated polyester was found to be 62° C.

A black toner composition comprised of 94 percent by weight of crosslinked polyester derived from the above unsaturated polyester resin with 1.45 percent by polymer weight of benzoyl peroxide, and with 6 percent by weight of REGAL 330 ® black pigment was prepared as follows.

The unsaturated polyester resin of this Example (58 grams) and benzoyl peroxide L-78 (0.85 gram) was charged into a Haake melt mixer B-135 available from HBI System. The melt mixer was then heated to 160° C. at a rotational mixing speed of 100 revolutions per minute for a duration of 15 minutes. The reaction mixture was then cooled to room temperature to afford the crosslinked polyester with a gel content of 48 percent. The crosslinked polyester was then milled in a coffee blender with 3.7 grams of REGAL 330 ®, and then heated in the Haake melt mixer to 120° C. at 100 rpm for a duration of 15 minutes. The composite mixture was then cooled to room temperature, and milled, broken into coarse particles utilizing a coffee bean grinder available from Black and Decker. A 2 inch Sturtevant micronizer was used to reduce the particle size further. After grinding, the toner was measured to display an average volume diameter particle size of 8.1 microns with a geometric distribution of 1.36 as measured by the Coulter Counter. The resulting toner was then utilized without further classification. A developer composition was prepared by roll milling the aforementioned toner, 3 parts by weight with 100 parts by weight of carrier comprised of a steel core with polyvinylidene polymer coating thereof, 0.75 percent by weight. Tribo data was obtained using the known blow-off Faraday Cage apparatus, and the toner developer was subjected to 20 percent humidity in a chamber for 48 hours, and at 80 percent humidity level in a chamber for 48 hours. The ratio of the corresponding triboelectric charge at 20 percent RH to 80 percent RH was measured to be 2.3. Unfused copies were then produced using a Xerox Corporation 1075 imaging apparatus with the fusing system disabled. The unfused copies were then subsequently fused on a Xerox Corporation 1075 fuser using a process speed of 11.9 inches per second. Fusing evaluation of the toner indicated a minimum fixing temperature of about 147° C., and hot-offset temperature of 180° C.

EXAMPLE IV

An unsaturated-polyester was prepared using 1,2-propanediol, ethanediol, terephthalic acid and fumaric acid of similar formulation as illustrated in Comparative Example III, and utilizing the two step addition process of the present invention as follows.

The first step was performed by adding terephthalic acid (564 grams), 1,2-ethanediol (49.6 grams), 1,2-propanediol (547.2 grams) and FASCAT TM (3.2 grams) into the Hoppes 2 liter pressure reactor equipped with a helical agitator and distillation apparatus. The mixture was heated to 240° C. under 420 killopascal pressure utilizing $CO_2$ gas. The mixture was stirred at 60 rpm for 4 hours, followed by decreasing the temperature to 220° C., and pressure to atmospheric pressure over a four hour period. The second step addition was then accomplished by adding fumaric acid (69.6 grams), and the reactor pressure was then decreased to 0.5 millibar over a 3 hour period during which time an additional 640 grams of byproduct were collected in the distillation receiver, followed by maintaining the pressure at 0.5 millibar for an additional hour. The reactor was then pressurized to atmospheric pressure with $CO_2$, and the product was discharged through the bottom drain valve into a metal dish. After the product was cooled to room temperature, the glass transition temperature of the unsaturated polyester was found to be 62.3° C.

A black toner composition comprised of 94 percent by weight of crosslinked polyester, derived from the above unsaturated polyester resin with 0.5 percent by polymer weight of benzoyl peroxide, and with 6 percent by weight of REGAL 330 ® black pigment was prepared as follows.

The unsaturated polyester resin of this Example (58 grams) and benzoyl peroxide L-78 (0.29 gram) was charged into a Haake melt mixer B-135 available from HBI System. The melt mixer was then heated to 160° C. at a rotational mixing speed of 100 revolutions per minute for a duration of 15 minutes. The reaction mixture was then cooled to room temperature to afford the crosslinked polyester with a gel content of 41 percent. The crosslinked polyester was then milled in a coffee blender with 3.7 grams of REGAL 330 ®, and then heated in the Haake melt mixer to 120° C. at 100 rpm for a duration of 15 minutes. The composite mixture was then cooled to room temperature, and milled, broken into coarse particles utilizing a coffee bean grinder available from Black and Decker. A 2 inch Sturtevant micronizer was used to reduce the particle size further. After grinding, the toner was measured to display an average volume diameter particle size of 8.0 microns with a geometric distribution of 1.34 as measured by the Coulter Counter. The resulting toner was then utilized without further classification. A developer composition was prepared by roll milling the aforementioned toner, 3 parts by weight, with 100 parts by weight of carrier comprised of a steel core with polyvinylidene polymer coating thereof, 0.75 weight percent. Tribo data was obtained using the known blow-off Faraday Cage apparatus, and the toner developer was subjected to 20 percent humidity in a chamber for 48 hours, and at 80 percent humidity level in a chamber for 48 hours. The ratio of the corresponding triboelectric charge at 20 percent RH to 80 percent RH was measured to be 1.8. Unfused copies were then produced using a Xerox Corporation 1075 imaging apparatus with the fusing system disabled. The unfused copies were then subsequently fused on a 1075 fuser using a process speed of 11.9 inches per second. Fusing evaluation of the toner indicated a minimum fixing temperature of about 146° C., and hot-offset temperature of 180° C.

The two step process of this Example resulted in a crosslinked toner derived from about 65 percent less initiator (benzoyl peroxide) than Comparative Example III, and resulted in a lower humidity sensitivity toner with substantially similar fusing results.

COMPARATIVE EXAMPLE V

An unsaturated polyester was prepared using 1,2-propanediol, 1,2-ethanediol, dimethyl terephthalate and fumaric acid by utilizing the one step process of the prior art as follows.

Dimethyl terephthalate (372 grams), 1,2-ethanediol (30 grams), 1,2-propanediol (308 grams), fumaric acid (30 grams) and FASCAT TM (3.2 grams) into a 1 liter reactor equipped with a double turbine agitator and distillation apparatus. The mixture was heated to 160° C., and then slowly to 190° C. over a 5 hour period, after which approximately 100 grams of methanol was collected in the distillation receiver. The temperature was then increased to 210° C. while decreasing the pressure from atmospheric to 0.1 millimeter-Hg over a 3 hour period, during which time the excess byproduct was collected in the distillation receiver, followed by maintaining the pressure at 0.5 millibar for an additional hour. The reaction product was then discharged through the bottom drain valve and cooled to ambient temperature. The glass transition temperature of the unsaturated polyester was found to be 58° C.

The unsaturated polyester resin of this Comparative Example (58 grams) and benzoyl peroxide L-78 (2 percent, 1.2 grams) was charged into a Haake melt mixer B-135 available from HBI System. The melt mixer was then heated to 160° C. at a rotational mixing speed of 100 revolutions per minute for a duration of 15 minutes. The reaction mixture was then cooled to room temperature to afford the crosslinked polyester with a gel content of 60 percent. The crosslinked polyester was then milled in a coffee blender with 3.7 grams of REGAL 330 ®, and then heated in the Haake melt mixer to 120° C. at 100 rpm for a duration of 15 minutes. The composite mixture was then cooled to room temperature, and milled, broken into coarse particles utilizing a coffee bean grinder available from Black and Decker. An 8 inch Sturtevant micronizer was used to reduce the particle size further. After grinding, the toner resulting was measured to display an average volume diameter particle size of 9.3 microns with a geometric distribution of 1.44 as measured by the Coulter Counter. The resulting toner was then utilized without further classification. A developer composition was prepared by roll milling the aforementioned toner, 3 parts by weight, with 100 parts by weight of carrier comprised of a steel core with polyvinylidene polymer coating thereof, 0.75 weight percent. Toner tribo data was obtained using the known blow-off Faraday Cage apparatus, and the toner developer was subjected to 20 percent humidity in a chamber for 48 hours, and at 80 percent humidity level in a chamber for 48 hours. The ratio of the corresponding triboelectric charge at 20 percent RH to 80 percent RH was measured to be 3.2. Unfused copies were then produced using a Xerox Corporation 1075 imaging apparatus with the fusing system disabled. The unfused copies were then subsequently fused on the 1075 fuser using a process speed of 11.9 inches per second. Fusing evaluation of the toner indicated a minimum fixing temperature of about 150° C., and hot-offset temperature of 195° C.

EXAMPLE VI

An unsaturated polyester is prepared using 1,2-propanediol, 1,2-ethanediol, dimethyl terephthalate and fumaric acid as formulated in Comparative Example V, but utilizing the two step addition process of the present invention as follows.

The first step was performed by adding dimethyl terephthalate (372 grams), 1,2-ethanediol (30 grams), 1,2-propanediol (308 grams) and FASCAT TM (3.2 grams) into a 1 liter reactor equipped with a double turbine agitator and distillation apparatus. The mixture was heated to 160° C., and then slowly to 190° C. over a 5 hour period, after which approximately 100 grams of methanol were collected in the distillation receiver. To this mixture was then added the second monomer, fumaric acid (30 grams), and heating was continued at 190° C. for 1 hour, followed by increasing the temperature to 210° C. while decreasing the pressure from atmospheric to 0.1 millimeter-Hg over a 3 hour period, during which time the excess byproduct was collected in the distillation receiver, followed by maintaining the pressure at 0.5 millibar for an additional hour. The reaction product was then discharged through the bottom drain valve and cooled to ambient temperature. The glass transition temperature of the unsaturated polyester was found to be 58° C.

The unsaturated polyester resin of this Example (58 grams) and benzoyl peroxide L-78 (1 percent, 0.6 gram) was charged into a Haake melt mixer B-135 available from HBI System. The melt mixer was then heated to 160° C. at a rotational mixing speed of 100 revolutions per minute for a duration of 15 minutes. The reaction mixture was then cooled to room temperature to afford a crosslinked polyester with a gel content of 60 percent. The crosslinked polyester was then milled in a coffee blender with 3.7 grams of REGAL 330 ®, and then heated in the Haake melt mixer to 120° C. at 100 rpm for a duration of 15 minutes. The composite mixture was then cooled to room temperature, and milled, broken into coarse particles utilizing a coffee bean grinder available from Black and Decker. An 8 inch Sturtevant micronizer was used to reduce the particle size further. After grinding, the toner was measured to display an average volume diameter particle size of 8.9 microns with a geometric distribution of 1.41 as measured by the Coulter Counter. The resulting toner was then utilized without further classification. A developer composition was prepared by roll milling the aforementioned toner, 3 parts by weight with 100 parts by weight of carrier comprised of a steel core with polyvinylidene polymer coating thereof. Tribo data was obtained using the known blow-off Faraday Cage apparatus, and the toner developer was subjected to 20 percent humidity in a chamber for 48 hours, and at 80 percent humidity level in a chamber for 48 hours. The ratio of the corresponding triboelectric charge at 20 percent RH to 80 percent RH was measured to be 2.5. Unfused copies were then produced using a Xerox Corporation 1075 imaging apparatus with the fusing system disabled. The unfused copies were then subsequently fused on the 1075 fuser using a process speed of 11.9 inches per second. Fusing evaluation of the toner indicated a minimum fixing temperature of about 150° C., and hot-offset temperature of 195° C.

In comparison to Comparative Example V, the two step process of this Example VI (and invention) resulted in a crosslinked toner derived from about 50 percent less initiator (benzoyl peroxide), and resulted in a lower humidity sensitivity toner with substantially similar fusing results.

EXAMPLE VII

An unsaturated polyester was prepared using 1,2-propanediol, 1,2-dipropyleneglycol, dimethyl terephthalate and fumaric acid utilizing the two step addition process of the present invention as follows.

The first step was performed by adding dimethyl terephthalate (337 grams), dipropyleneglycol (26 grams), 1,2-propanediol (279 grams) and FASCAT TM (0.8 gram) into a 1 liter reactor equipped with a double turbine agitator and distillation apparatus. The mixture was heated to 160° C., and then slowly to 190° C. over a 5 hour period, after which approximately 100 grams of methanol were collected in the distillation receiver. To this mixture was then added the second monomer, fumaric acid (22.3 grams), and heating was continued at 190° C. for 1 hour, followed by increasing the temperature to 210° C. while decreasing the pressure from atmospheric to 0.1 millimeter-Hg over a 3 hour period, during which time the excess byproduct was collected in the distillation receiver, followed by maintaining the pressure at 0.5 millibar for an additional hour. The reaction product was then discharged through the bottom drain valve and cooled to ambient temperature. The glass transition temperature of the unsaturated polyester was found to be 56.7° C.

The unsaturated polyester resin of this Example (58 grams) and benzoyl peroxide L-78 (0.3 percent, 0.18 gram) was charged into a Haake melt mixer B-135 available from HBI System. The melt mixer was then heated to 160° C. at a rotational mixing speed of 100 revolutions per minute for a duration of 15 minutes. The reaction mixture was then cooled to room temperature to afford the crosslinked polyester with a gel content of 32 percent. The crosslinked polyester was then milled in a coffee blender with 3.7 grams of REGAL 330 ®, and then heated in the Haake melt mixer to 120° C. at 100 rpm for a duration of 15 minutes. The composite mixture was then cooled to room temperature, and milled, broken into coarse particles utilizing a coffee bean grinder available from Black and Decker. An 8 inch Sturtevant micronizer was used to reduce the particle size further. After grinding, the toner was measured to display an average volume diameter particle size of 7.9 microns with a geometric distribution of 1.39 as measured by the Coulter Counter. The resulting toner was then utilized without further classification. A developer composition was prepared by roll milling the aforementioned toner, 3 parts by weight with 100 parts by weight of carrier comprised of a steel core with polyvinylidene polymer coating thereof. Tribo data was obtained using the known blow-off Faraday Cage apparatus, and the toner developer was subjected to 20 percent humidity in a chamber for 48 hours, and at 80 percent humidity level in a chamber for 48 hours. The ratio of the corresponding triboelectric charge at 20 percent RH to 80 percent RH was measured to be 2.1. Unfused copies were then produced using a Xerox Corporation 1075 imaging apparatus with the fusing system disabled. The unfused copies were then subsequently fused on the 1075 fuser using a process speed of 11.9 inches per second. Fusing evaluation of the toner indicated a minimum fixing temperature of about 147° C., and hot-offset temperature of 185° C.

EXAMPLE VIII

An unsaturated polyester is prepared with 1,2-propanediol, 1,2-dipropyleneglycol, dimethyl terephthalate and fumaric acid utilizing the two step addition process of the present invention as follows.

The first step was performed by adding dimethyl terephthalate (307 grams), dipropyleneglycol (32 grams), 1,2-propanediol (273.5 grams) and FASCAT TM (0.6 gram) into a 1 liter reactor equipped with a double turbine agitator and distillation apparatus. The mixture was heated to 160° C., and then slowly to 190° C. over a 5 hour period, after which approximately 100 grams of methanol were collected in the distillation receiver. To this mixture was then added the second monomer addition, fumaric acid (39 grams), and heating was continued at 190° C. for 1 hour, followed by increasing the temperature to 210° C. while decreasing the pressure from atmospheric to 0.1 millimeter-Hg over a 3 hour period, during which time the excess byproduct was collected in the distillation receiver, followed by maintaining the pressure at 0.5 millibar for an additional hour. The reaction product was then discharged through the bottom drain valve and cooled to ambient temperature. The glass transition temperature of the unsaturated polyester was found to be 59° C.

The unsaturated polyester resin of this Example (58 grams) and benzoyl peroxide L-78 (0.3 percent, 0.18 gram) was charged into a Haake melt mixer B-135 available from HBI System. The melt mixer was then heated to 160° C. at a rotational mixing speed of 100 revolutions per minute for a duration of 15 minutes. The reaction mixture was then cooled to room temperature to provide the crosslinked polyester with a gel content of 41 percent. The crosslinked polyester was then milled in a coffee blender with 3.7 grams of REGAL 330 ®, and then heated in the Haake melt mixer to 120° C. at 100 rpm for a duration of 15 minutes. The composite mixture was then cooled to room temperature, and milled, broken into coarse particles utilizing a coffee bean grinder available from Black and Decker. An 8 inch Sturtevant micronizer was used to reduce the particle size further. After grinding, the toner was measured to display an average volume diameter particle size of 7.7 microns with a geometric distribution of 1.38 as measured by the Coulter Counter. The resulting toner was then utilized without further classification. A developer composition was prepared by roll milling the aforementioned toner, 3 parts by weight, with 100 parts by weight of carrier comprised of a steel core with polyvinylidene polymer coating thereof. The tribo data was obtained using the known blow-off Faraday Cage apparatus, and the toner developer was subjected to 20 percent humidity in a chamber for 48 hours, and at 80 percent humidity level in a chamber for 48 hours. The ratio of the corresponding triboelectric charge at 20 percent RH to 80 percent RH was measured to be 2.2. Unfused copies were then produced using a Xerox Corporation 1075 imaging apparatus with the fusing system disabled. The unfused copies were then subsequently fused on the 1075 fuser using a process speed of 11.9 inches per second. Fusing evaluation of the toner indicated a minimum fixing temperature of about 145° C., and hot-offset temperature of 180° C.

Other embodiments and modifications of the present invention may occur to those skilled in the art subsequent to a review of the information presented herein; these embodiments and modifications, as well as equivalents thereof, are also included within the scope of this invention.

What is claimed is:

1. A two-step process for the preparation of an unsaturated polyester consisting essentially of the first reaction of a phthalate and a glycol to provide a transesterified product, and subsequently reacting said product with an unsaturated dicarboxylic acid, and wherein the first reaction is accomplished in the presence of a catalyst selected from the group of consisting of tetraisopropyl orthotitanate, monobutyl tin oxide, and dibutyl tin oxide, and wherein said aforementioned reactions are accomplished by heating at a temperature of from about 175° C. to about 220° C.

2. A process in accordance with claim 1 wherein the glycol contains from 2 to about 25 carbon atoms.

3. A process in accordance with claim 1 wherein the glycol is an alkanediol.

4. A process in accordance with claim 1 wherein the glycol is selected from the group comprised of 1,2-ethanediol, 1,2-propanediol, 1,3-propanediol, 1,2-butanediol, 1,3-butanediol, 1,4-butanediol, 1,2-pentanediol, 1,3-pentanediol, 1,4-pentanediol, 1,5-pentanediol, 1,6-hexanediol, diethylene glycol, neopentyl glycol, dipropylene glycol, dibromoneopentyl glycol, 2,2,4-trimethylpentane, 1,4-cyclohexanediol, 1,3-cyclohexanediol, 1,4-cyclohexanedimethanol, 1,3-cyclohexanedimethanolethylene glycol, propylene glycol, or mixtures thereof.

5. A process in accordance with claim 1 wherein the phthalate is terephthalic acid, isophthalic acid, phthalic acid, benzophenone-4-4'-dicarboxylic acid, 1,2-diphenoxyethane-p,p'-dicarboxylic acid, naphthalene dicarboxylic acid, tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, dimethylterephthalate, diethylterephthalate, dibutylterephthalate, dipropylterephthalate, dimethylisophthalate, or mixtures thereof.

6. A process in accordance with claim 1 wherein the unsaturated dicarboxylic acid is fumaric acid.

7. A process in accordance with claim 2 wherein the unsaturated dicarboxylic acid is selected from the group comprised of maleic acid, fumaric acid, chloromaleic acid, itaconic acid, citraconic acid, and mesaconic acid.

8. A process in accordance with claim 1 wherein the reaction of the phthalate dialkylterephthalate and said glycol is accomplished in the presence of said catalyst by heating the aforementioned mixture to a temperature of from about 160° C. to about 190° C. for a duration of from about 3 hours to about 6 hours, and wherein the methanol byproduct is collected in an amount of from about 80 to about 95 percent of the theoretical amount total methanol to be collected.

9. A process in accordance with claim 1 wherein the transesterified product is subsequently reacted with an unsaturated dicarboxylate by heating at from about 175° C. to about 190° C. for a duration of about 1 hour, followed by heating the mixture from about 190° C. to about 220° C. and reducing the pressure from about 760 millimeters-Hg to about 0.1 millimeter-Hg during a period of from about 3 hours to about 6 hours, and wherein about 40 to about 50 mole percent of the excess glycol is collected in the distillation receiver, followed by collecting the product and cooling to ambient temperature.

10. A process in accordance with claim 1 wherein the catalyst is selected in an amount of from about 0.01 to about 1 mole percent of polymer.

11. A two-step process for the preparation of the unsaturated polyester poly(1,2-propyleneterephthalate/1,2-propylenefumarate) copolymer consisting essentially of a first reaction of dimethyl terephthalate and 1,2-propanediol in the presence of a titanium isopropoxide catalyst, and a second step of adding dimethyl fumarate; and wherein the first step reaction is accomplished by heating at a temperature of from about 160° C. to about 190° C., and the second step reaction is accomplished at a temperature of from about 175° C. to about 190° C.; and wherein said polyester is subsequently crosslinked with a free radical initiator present in a low concentration of from about 0.05 to about 1 weight percent.

12. A process for the preparation of an unsaturated polyester resin consisting essentially of two steps when the first step consists of (a) charging a reactor equipped with a double turbine agitator and distillation receiver with about 30 to about 45 mole percent of a diester, from about 95 to about 100 mole percent of diol, the diols 1,2-propanediol or 1,2-ethanediol, and a transesterification catalyst, oxide hydroxide or dibutyltin oxide; (b) heating the aforementioned mixture to a temperature of from about 160° C. to about 190° C. for a duration of from about 3 hours to about 6 hours, and wherein the transesterification product comprised of bis(glycol)-terephthalate is formed; followed by a second step comprised of (c) adding to the reactor mixture from about 5 to about 20 mole percent of fumaric acid or dimethyl-terephthalate; and (d) heating at from about 175° C. to about 190° C. for a duration of about 1 hour, followed by heating the mixture from about 190° C. to about 220° C. and reducing the pressure to from about 760 millimeters-Hg to about 0.1 millimeter-Hg during a period of from about 3 hours to about 6 hours.

13. A process for the preparation of a crosslinked polyester consisting of the first reaction of a phthalate and a glycol or mixture of glycols to provide a transesterified product, and subsequently reacting said product with an unsaturated dicarboxylate monomer, the improvement residing in subjecting said polyester obtained to crosslinking with a free radical initiator present in a low concentration of from about 0.05 to about 1 weight percent, and which crosslinking is accomplished in a reactive extrusion apparatus, and wherein the initiator is benzylperoxide.

* * * * *